(12) United States Patent
Kim et al.

(10) Patent No.: US 7,544,429 B2
(45) Date of Patent: Jun. 9, 2009

(54) MEMBRANELESS AND MEDIATORLESS MICROBIAL FUEL CELL

(75) Inventors: Byung Hong Kim, Seoul (KR); In Seop Chang, Seoul (KR); Jae Kyung Jang, Seoul (KR); Geun Cheol Gil, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 835 days.

(21) Appl. No.: 10/514,180

(22) PCT Filed: May 14, 2003

(86) PCT No.: PCT/KR03/00950

§ 371 (c)(1),
(2), (4) Date: Nov. 12, 2004

(87) PCT Pub. No.: WO03/096467

PCT Pub. Date: Nov. 20, 2003

(65) Prior Publication Data

US 2005/0208343 A1  Sep. 22, 2005

(30) Foreign Application Priority Data

May 14, 2002 (KR) .................. 10-2002-0026351

(51) Int. Cl.
*H01M 8/16* (2006.01)
*H01M 8/04* (2006.01)
*H01M 4/00* (2006.01)
*H01M 4/96* (2006.01)

(52) U.S. Cl. .................. 429/2; 429/44; 429/45; 429/14; 429/17

(58) Field of Classification Search .............. 429/2, 429/12, 17, 67–70, 13; 204/403.09, 403.1, 204/412, 415, 242, 275.1
See application file for complete search history.

(56) References Cited

U.S. PATENT DOCUMENTS 5,126,034 A * 6/1992 Carter et al. ........... 204/403.05
5,976,719 A * 11/1999 Kim et al. .................... 429/2

* cited by examiner

*Primary Examiner*—Alexa D Neckel
*Assistant Examiner*—Claire L Rademaker
(74) *Attorney, Agent, or Firm*—Jones Day

(57) ABSTRACT

Disclosed is a mediator-less microbial fuel cell comprising a cathode compartment, an anode compartment, with or without glass wool and glass bead for separating the two compartments, an element for feeding air to the cathode compartment, and an element for feeding wastewater to the anode compartment. The cell further comprises an element for controlling the distance between the cathode compartment and the anode compartment. Graphite felt or graphite felt coated with a metal such as platinum is used as an electrode of the cathode compartment, and a buffer solution is used in the anode compartment. A mediator-less microbial fuel cell according to the present invention can be operated without using an expensive cation-exchange membrane, of which efficiency is by no means inferior to prior wastewater treatment methods.

5 Claims, 6 Drawing Sheets

A: Graphite 1.96g

B: Platinum coated graphite 3.20g

C: Graphite 3.74 g

US 7,544,429 B2

MEMBRANELESS AND MEDIATORLESS MICROBIAL FUEL CELL

CROSS-REFERENCE TO RELATED APPLICATIONS

This application is a national stage filing under 35 U.S.C. § 371 of International Patent Application No. PCT/KR2003/000950, filed May 14, 2003, and claims the benefit of Korean Patent Application No. 10-2002-0026351, filed May 14, 2002.

TECHNICAL FIELD

The present invention relates to an improved membrane-less and mediator-less microbial fuel cell for treating wastewater.

The present invention is based on the technology of using a microbial fuel cell that converts chemical energy into electrical energy through the metabolism of microorganisms, in which the chemical energy is in the form of organic substances present in wastewater.

BACKGROUND ART

It is known that most microorganisms have an outer cellular structure, which shows strong non-conductivity. Therefore, in most cases it is difficult for electrons to be transferred to an electrode from the electron transfer reaction occurring in the membrane of the cell. Thus, a microbial fuel cell using ordinary microorganisms essentially uses an electron transfer mediator in order to transfer electrons from the electron transfer system of the microorganisms to an electrode. However, such a mediator is generally a toxic substance and may cause secondary pollution. The mediator also has disadvantages in that it (i) may adhere to an electrode to decrease overall efficiency when used for a long time; (ii) is an aromatic compound, which are toxic to microorganisms; and (iii) is expensive. As such, there are limitations to their use.

If such a mediator is not used, as disclosed by the present inventors, electrons and protons are generated during metabolism of microorganisms, in which the electrons can be directly transferred to an electrode without using a mediator. Subsequently, electrons are transferred to a cathode compartment and the protons are transferred to the cathode compartment via a cation-exchange membrane so that they can be oxidized by oxygen with the electrons [see Kim, Byunghong et al., Korean Patent No. 224381 entitled "Biofuel Cell Using Metal Salt-Reducing Bacteria," U.S. Pat. No. 5,976,719, Japanese Patent No. 3022431 and EP Patent Application No. 97306661.6].

The present inventors have also found that microorganisms other than the metal salt-reducing bacteria used in the above-cited patents, which can directly transfer electrons previously generated from oxidation of organic substances to an electrode (anode compartment) as metal salt-reducing bacteria, are abundantly present in natural systems, particularly wastewater treatment systems, etc., and can be naturally densely cultured without a separate isolation and culture process during the operation of a biofuel cell [see Kim Byunghong et al., PCT Patent Application No. PCT/KR00/00288 entitled "A Biofuel Cell Using Wastewater and Active Sludge for Wastewater Treatment"].

However, in microbial fuel cells developed hitherto, the cathode compartment and anode compartment have been separated from each other. The generation and transfer of electrons and protons by means of bio-reaction in an anode compartment and the consumption of electrons and protons by means of the reaction of $4e^- + 4H^+ + O_2 \rightarrow H_2O$ should occur integrally with each other, and a circuit should be formed for operating microbial fuel cells for wastewater (sewage) treatment in a continuous manner. Thus, a cation-exchange membrane has been used to transfer protons from the anode compartment to the cathode compartment. If microorganisms in an anode compartment are sufficiently cultured during the process, protons are transferred via a cation-exchange membrane while the amount of electrons generated from the anode compartment and then fed to the cathode compartment can be controlled. A cation-exchange membrane, however, has been found to have limitations on the transfer of protons (Gil Geun Cheol et al., Operational parameters affecting the performance of a mediator-less microbial fuel cell, Biosensors & Bioelectronics, 2003, 18, 327-334). Furthermore, protons generated during metabolism of microorganisms in an anode compartment are not smoothly transferred across a cation-exchange membrane. This is primarily due to membrane fouling. Therefore, a pH decrease in the anode compartment typically occurs when a buffer solution is not used therein. Also, it is so expensive that it has cost limitations as a material used for wastewater (sewage) treatment.

DISCLOSURE OF THE INVENTION

The present inventors have conducted extensive research to solve the problems mentioned above. As a result, the inventors have prepared an improved mediator-less microbial fuel cell, which can be operated without using a cation-exchange membrane and poses none of the above-mentioned problems, and which has an efficiency that is by no means inferior to prior wastewater treatment methods.

It is therefore an object of the present invention to provide an improved mediator-less microbial fuel cell, which can be operated without using a cation-exchange membrane and poses none of the above-mentioned problems, and which has an efficiency that is by no means inferior to prior wastewater treatment methods. A membrane-less and mediator-less microbial fuel cell according to the present invention is an improved device capable of being utilized in a process of treating wastewater (sewage) with electricity generation.

Further, a membrane-less and mediator-less microbial fuel cell of the present invention is based on a novel and unique concept that wastewater introduced in an anode compartment is anaerobically treated, and then transferred to a cathode compartment via glass wool and glass bead separating the two compartments so as to be aerobically treated.

As described above, the present invention is characterized by improving a microbial fuel cell to enable it to treat wastewater (sewage) without using a cation-exchange membrane. In other words, the present invention relates to a membrane-less and mediator-less microbial fuel cell comprising a cathode compartment, an anode compartment, glass wool and glass bead for separating the two compartments, a means for feeding air to the cathode compartment, and a means for feeding wastewater to the anode compartment.

Moreover, the present invention further relates to a microbial fuel cell based on a novel and unique concept of first anaerobically treating wastewater in an anode compartment and then aerobically treating wastewater in a cathode compartment.

The membrane-less and mediator-less microbial fuel cell according to the present invention further comprises a means for controlling the distance between a cathode compartment and an anode compartment, and uses carbon nonwoven fabric (graphite felt) or graphite felt coated with metal, for example, platinum, as an electrode in the cathode compartment.

Further, a membrane-less and mediator-less microbial fuel cell according to the present invention can use a buffer solution in an anode compartment in order to maintain the optimum pH for growth of microorganisms in the presence of organic acids generated when artificial wastewater is fed as a fuel so that the activity of microorganisms distributed in the anode compartment is kept constant.

BRIEF DESCRIPTION OF THE DRAWINGS

The above and other objects and aspect of the invention are apparent from the following description of embodiments with reference to the accompanying drawing, in which:

FIG. 3 is a graph showing a pH change in the microbial fuel cell of FIG. 2a.

MODE FOR CARRYING OUT THE INVENTION

The preferred embodiments of the present invention are described in detail below.

Used as a microbial fuel cell is a cylindrical reactor with a diameter of 10 cm and a height of 100 cm comprising an anode compartment, which is positioned at a lower portion, and a cathode compartment, which is positioned above the anode compartment, wherein the reactor is filled to a height of 10 cm with glass wool and glass bead for separating the two compartments.

Wastewater of a BOD concentration (300 ppm) is introduced into a lower portion of the microbial fuel cell and discharged at a middle portion of the cathode compartment after passing through the anode compartment and glass wool separation layer. The wastewater is then collected underneath an electrode of the cathode compartment, and COD is measured to determine the treatment efficiency of organic substances. The quantity of electric charge (Coulomb) is calculated by integrating the electric current generated over time. The result is analyzed for correlation to organic substances removed from the cell, in order to determine electricity generation efficiency.

The electric current generated at the time is measured while controlling various rate-controlling conditions observed in the microbial fuel cell at a resistance of 10Ω, especially while preventing oxygen supply, proton permeability, etc., from acting rate-controllably.

According to the present invention, it is important that oxygen is sufficiently fed to a cathode compartment since oxygen supply is a significant rate-controlling factor.

According to the present invention, the reaction rate and efficiency can be improved by coating the electrode used in a cathode compartment with platinum (Pt).

According to the present invention, when the distance between an anode compartment and a cathode compartment is made as short as possible, the internal resistance is sufficiently higher than the external resistance and a series of reactions occur more rapidly so that efficiency can reach a maximum.

Figure 1:
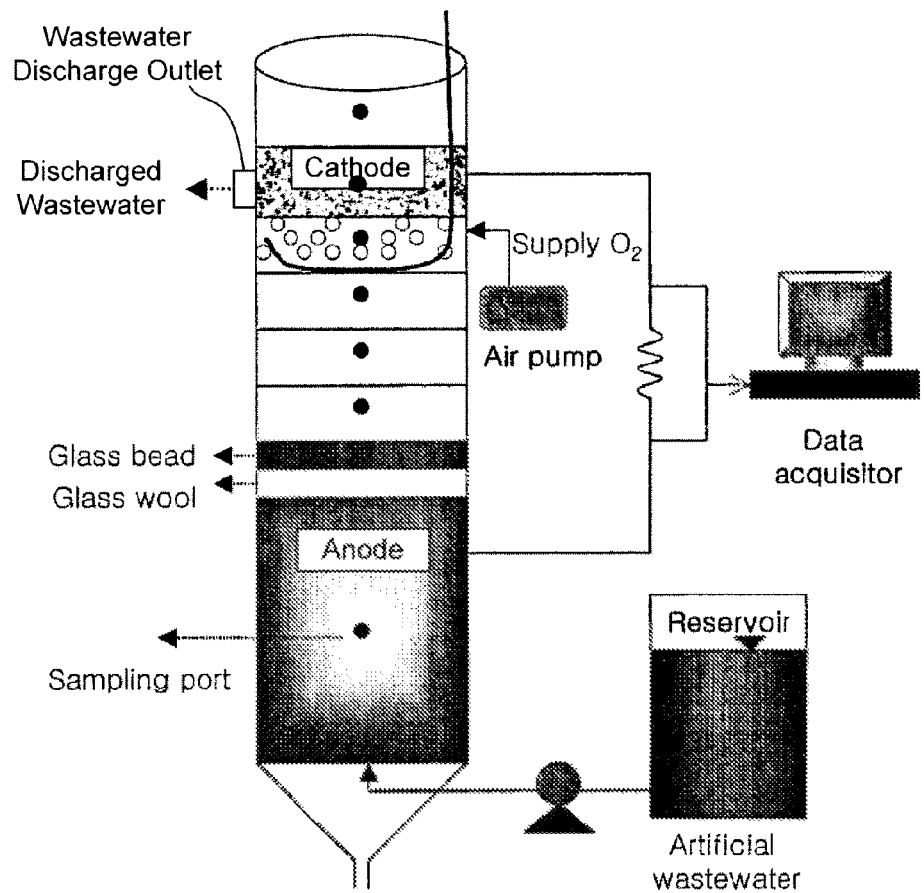
FIG. 1 is a schematic diagram showing a mediator-less microbial fuel cell, which does not use a cation-exchange membrane, and an overall system for operating the cell and recording electric currents.

According to the present invention, a device having a type represented in FIG. 1 is used to treat wastewater continuously. As shown in FIG. 1, wastewater kept in a reservoir is introduced into a lower portion of an anode compartment of a microbial fuel cell by means of a flow control pump. While wastewater is flowing upward through the anode compartment, organic substances present in the wastewater are oxidized by microorganisms, thus resulting in the generation of electrons. These electrons are transferred to the anode and to the cathode after passing through an external resistance. Under the assumption that the maximum transfer rate of electron to the cathode compartment is equal to the decomposition rate of the aforesaid organic substances in the anode compartment, air is fed so that electrons can be sufficiently consumed in a range greater than the decomposition rate.

The following examples are presented to provide a more detailed understanding of the invention. They are for illustrative purposes only and are not to be taken as limitative.

EXAMPLES

Example 1

The Effect of the Buffering Capacity and the Feeding Rate of Oxygen, which are Rate-Controlling Factors, on a Series of Reactions in a Cathode Compartment This example is to identify rate-controlling factors by measuring the electric current generated by using a microbial fuel cell having a cation-exchange membrane and the pH change in a cathode compartment.

Figure 2A:
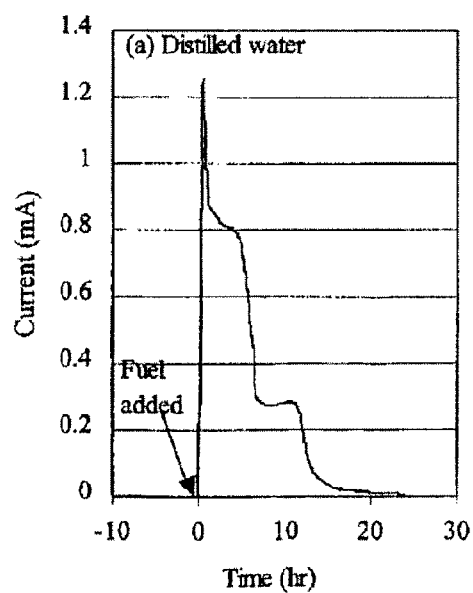
FIG. 2a is a graph showing the trend of electric currents generated by using distilled water in a cathode compartment during operation of a mediator-less microbial fuel cell.
Figure 2B:
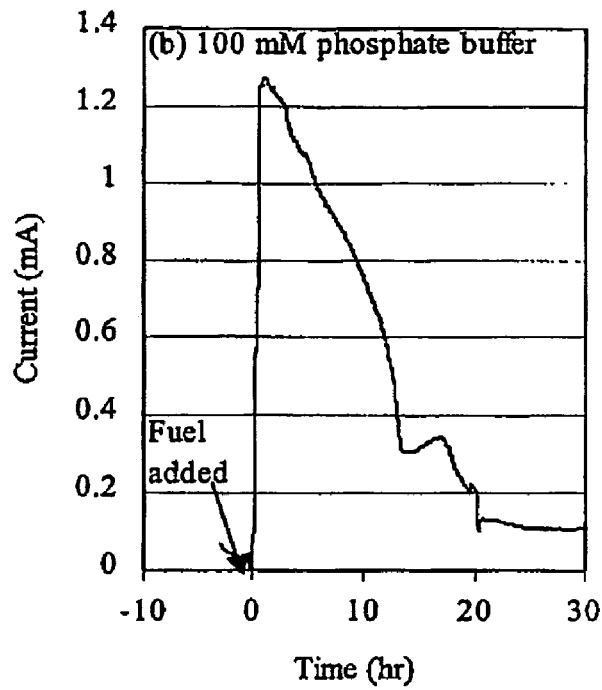
FIG. 2b is a graph showing the trend of electric currents generated by using a phosphate buffer solution in a cathode compartment during operation of a mediator-less microbial fuel cell.
Figure 3:
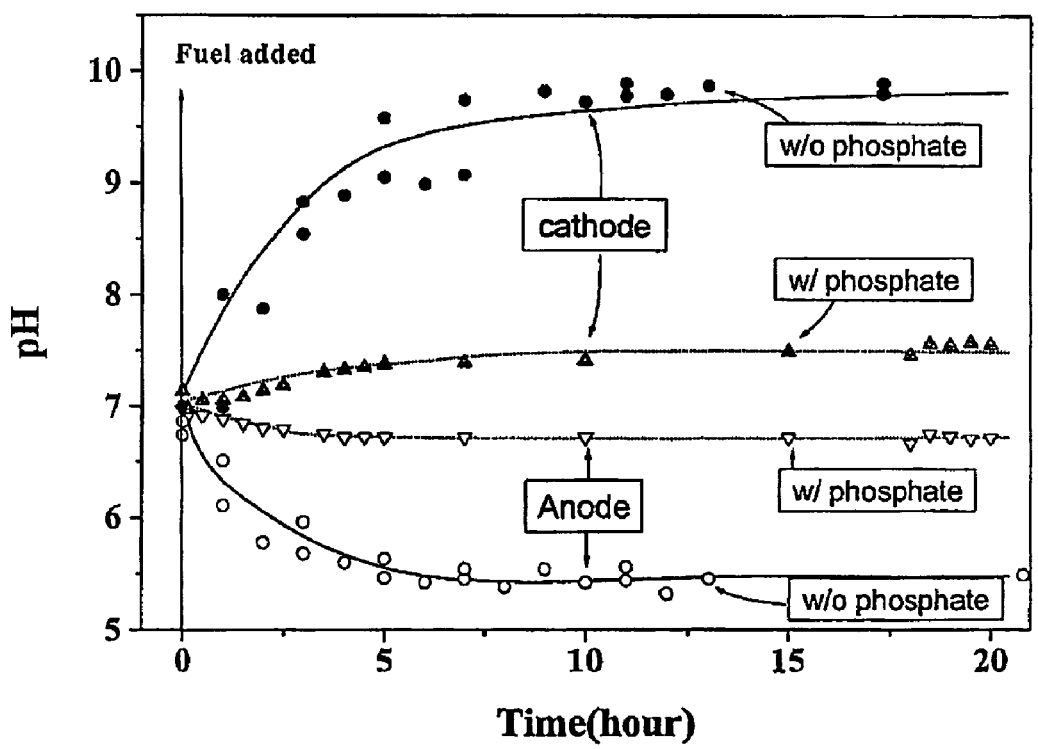

10Ω resistance was connected to a mediator-less microbial fuel cell while feeding 400 ppm wastewater to the cell, and the electric current generated was measured to record the results in FIGS. 2a and 2b. Further, the pH in the cathode compartment was measured to record the results in FIG. 3.

FIG. 2a shows the trend of electric current generated by using distilled water in a cathode compartment. When wastewater was fed as a fuel, an electric current of up to 1.3 mA was generated and then rapidly decreased to maintain around 0.8 mA. The electric current then further decreased to 0.3 mA. The result shows that although microorganisms in an anode compartment have the capacity for generating an electric current of at least 1.3 mA, said electric current cannot be maintained to the maximum current generated by the microorganisms due to other rate-controlling factors.

FIG. 2b, however, shows the trend of the electric current generated by using phosphate buffer solution in a cathode compartment, where the initial decrease rate of the electric current was remarkably low. The pH was increased to at least 9.5 in the cathode compartment, and then decreased to 5.4 in the anode compartment, when using distilled water. Considering the definition of pH (the negative logarithm of the proton concentration (water concentration)), such facts show that the generation rate of protons in the anode compartment is higher than the rate of protons transferred via a cation-exchange membrane, and the reaction in the cathode compartment is restricted by protons. When a phosphate buffer solution was used, the value of pH changed within a range of 0.5. It is further understood from FIGS. 2a and 2b that the value of the electric current was decreased the second time because oxygen was not fed sufficiently.

Example 2

Enrichment Culture using a Fuel Cell having no Cation-Exchange Membrane

This example demonstrates that electrochemically active microorganisms essential to operate a mediator-less microbial fuel cell can be enriched using a fuel cell having no cation-exchange membrane according to the present invention.

For this purpose, artificial wastewater was used which had components other than organic substances acting as an electron donor, as described in Table 1 below. The inoculation source used for the enrichment culture was the aerobic digester sludge of a sewage disposal plant.

TABLE 1

Components other than organic substances in artificial wastewater

| Components | Composition |
| --- | --- |
| $(NH_4)_2SO_4$ | 0.141 g |
| $MgSO_4 \cdot 7H_2O$ | 0.05 g |
| $CaCl_2$ | 3.75 mg |
| $FeCl_3 \cdot 6H_2O$ | 0.25 mg |
| $MnSO_4 \cdot H_2O$ | 5 mg |
| $NaHCO_3$ | 0.105 g |
| Trace mineral solution | 10 ml |
| Phosphate buffer solution (1M, pH 7.0) | 50 ml |
| Distilled water | 940 ml |
| Trace mineral (Balows et al, 1991) | |
| Nitrilotriacetic acid (NTA) | 1.5 (g/L) |
| $FeSO_4 \cdot 7H_2O$ | 0.1 |
| $MnCl_2 \cdot 4H_2O$ | 0.1 |
| $CoCl_2 \cdot 6H_2O$ | 0.17 |
| $ZnCl_2$ | 0.1 |
| $CaCl_2 \cdot 2H_2O$ | 0.1 |
| $CuCl_2 \cdot 2H_2O$ | 0.02 |
| $H_3BO_3$ | 0.01 |
| $Na_2MoO_3$ | 0.01 |
| $Na_2SeO_3$ | 0.017 |
| $NiSO_4 \cdot 6H_2O$ | 0.026 |
| NaCl | 1.0 |

A 50 mg/l of $K_2HPO_4$ buffer solution was added in addition to the composition of components described in above Table 1. Furthermore, 150 ppm of glutamic acid and glucose, respectively, were added as organic substances to prepare artificial wastewater of 300 ppm BOD. The change of concentration of the artificial wastewater was achieved by changing the concentration of the organic substances while keeping their composition ratio constant.

The microbial fuel cell used in this experiment was the cell described in FIG. 1. The cell had an anode compartment equipped with 196 g rolled graphite felt and a cathode compartment equipped with ten (10) pieces of 53.25 g folded graphite felt (thickness 1.27 cm and diameter 10 cm). Platinum line was used as electrode wiring in the graphite felt, and working resistance was set at 10 Ω. The flow rate of wastewater transferred from the reservoir to the anode compartment was kept constant at 0.28 ml/min, and air was fed to the cathode compartment at a rate of 60 ml/min by means of a pump. When wastewater of a maximum 300 ppm was fed to the anode compartment at a rate of 0.28 ml/min, the feeding rate of oxygen was sufficient to allow a reaction with electrons.

Figure 4:
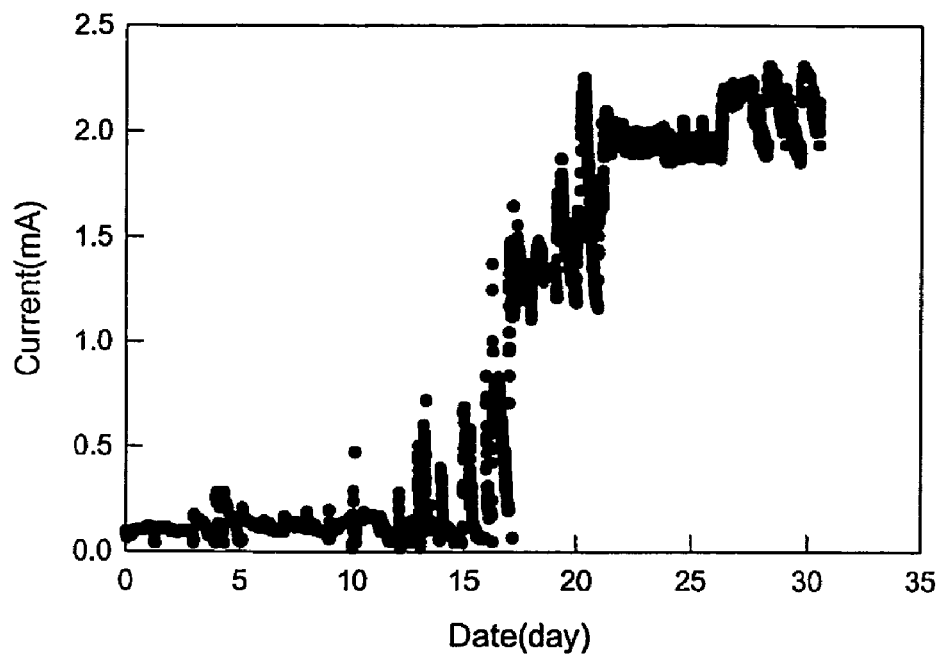
FIG. 4 is a graph showing the change in electric current generated during the enrichment culture process of electrochemically active microorganisms in a membrane-less and mediator-less microbial fuel cell using wastewater of 300 ppm BOD (Biochemical Oxygen Demand).

After adjusting the pH of 300 ppm artificial wastewater to 7.0, the generated electric current and the COD were measured while continuously introducing the wastewater. FIG. 4 illustrates that the electric current increased to about 2.0 mA 20 days after wastewater introduction. This indicates that microorganisms, which transferred electrons to the electrode of the anode compartment, were enriched.

Example 3

Figure 5A:
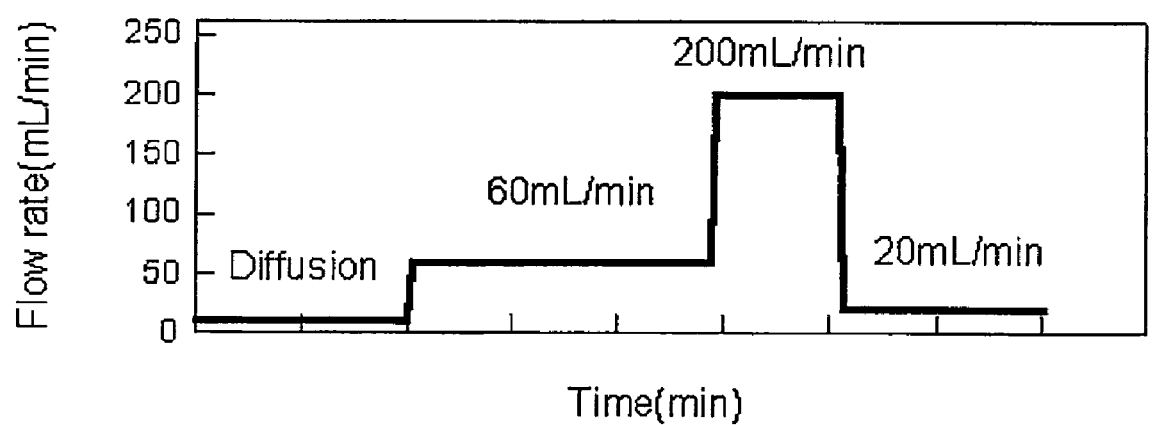
FIG. 5 is a graph showing the relationship between the flow rate of air fed to a cathode compartment of an enriched microbial fuel cell and the electric current generation.
Figure 5B:
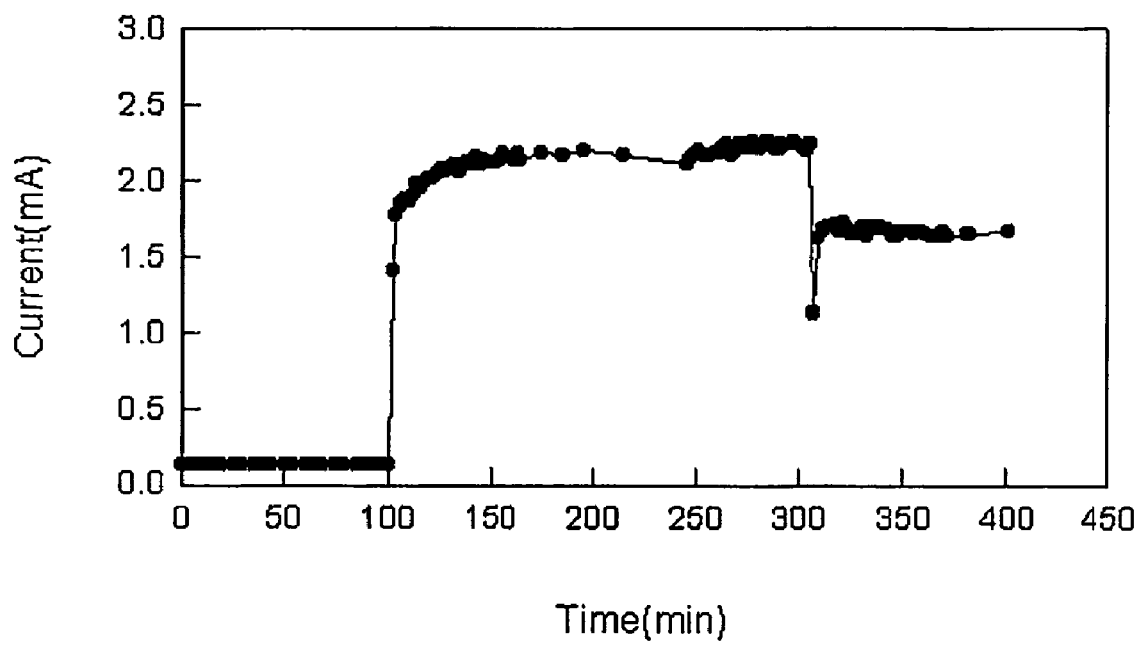
Figure 5C:
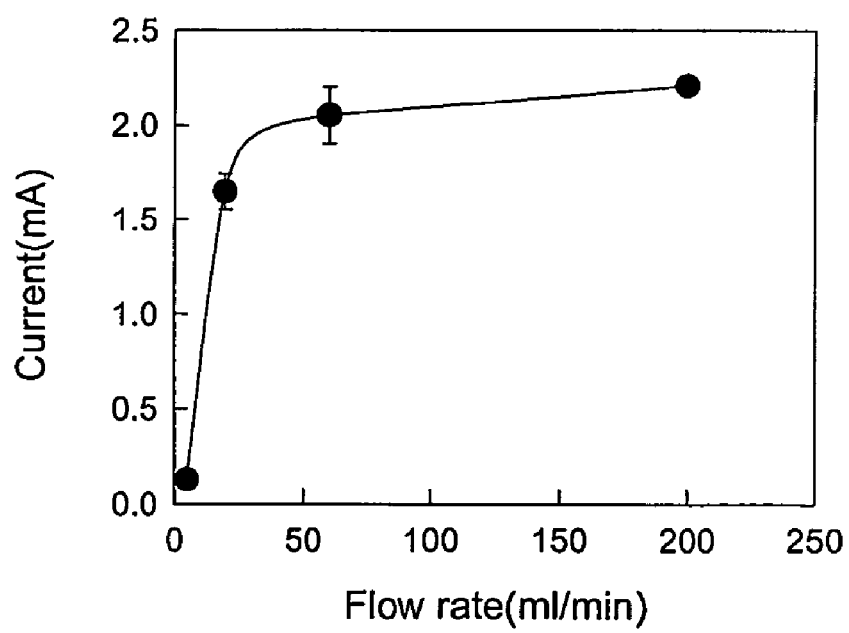

Effect of the Feeding Rate of Oxygen to the Cathode Compartment on the Performance of a Microbial Fuel Cell FIG. 5 shows the result of electric current generated by changing the rate of air fed to a cathode compartment while feeding 300 ppm artificial wastewater to an anode compartment. A microbial fuel cell was operated under conditions such that air was not artificially fed and oxygen was absorbed via the water surface of the cathode compartment. As a result, 0.15 mA electric current was generated. When air was fed at a rate of 60 ml/min, however, the generated electric current slowly increased to 2.1 mA. When the air feeding rate was increased to 200 ml/min, the large change in electric current observed at 60 ml/min was not observed. When the feeding rate was decreased to 20 ml/min, the generated electric current decreased to about 1.7 mA. When air was fed at a rate of 60 m/min, the concentration of dissolved oxygen in a cathode compartment was measured to about 7.5 ppm. The results show that the air feeding rate should be at least 60 ml/min when treating wastewater of 300 ppm BOD. The rate of air fed to a cathode compartment should also be changed according to the concentration of artificial wastewater introduced into the anode compartment.

Figure 8:
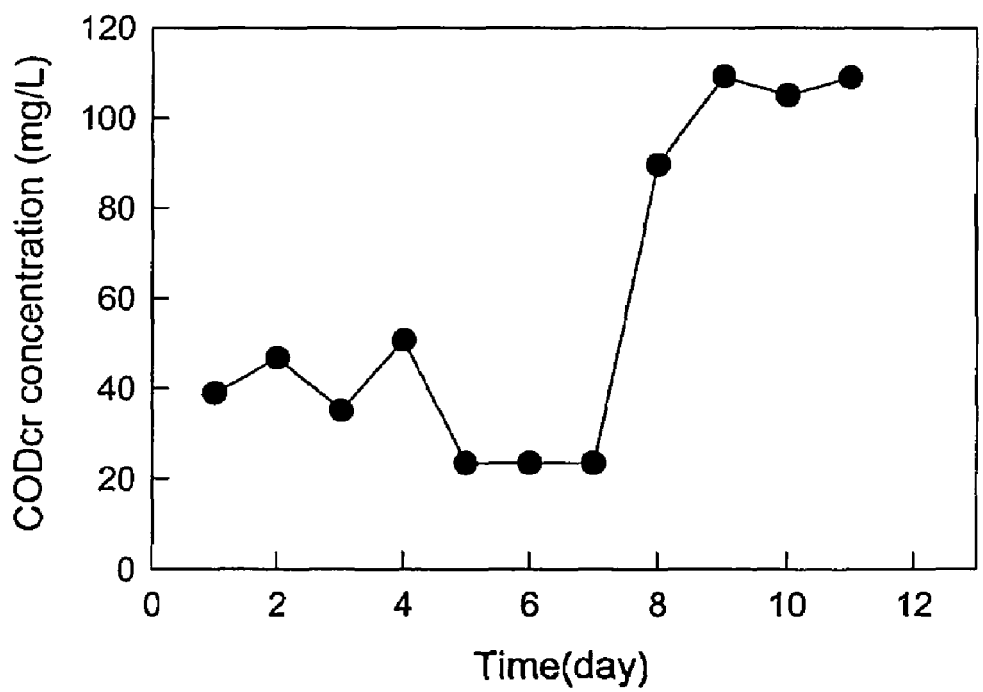
FIG. 8 is a graph showing the change in COD (Chemical Oxygen Demand) removal efficiency according to operation conditions of an enriched microbial fuel cell.

Under 60 ml/min air feeding rate with wastewater of 300 ppm BOD, a COD change of efflux, discharged via the anode compartment when oxygen was no longer fed, was measured to examine the effect of oxygen feeding. The result is shown in FIG. 8. Said result shows that organic substances in an anode compartment are less decomposed when oxygen is not sufficiently fed. This is understood to indicate that since the generation of electric currents is affected by the feeding rate of oxygen, a proper feeding rate is important for the biofuel cell to operate at an optimum state.

Example 4

Effect of Platinum (Pt):Catalyst as a Cathode on the Current Generation

Figure 6A:
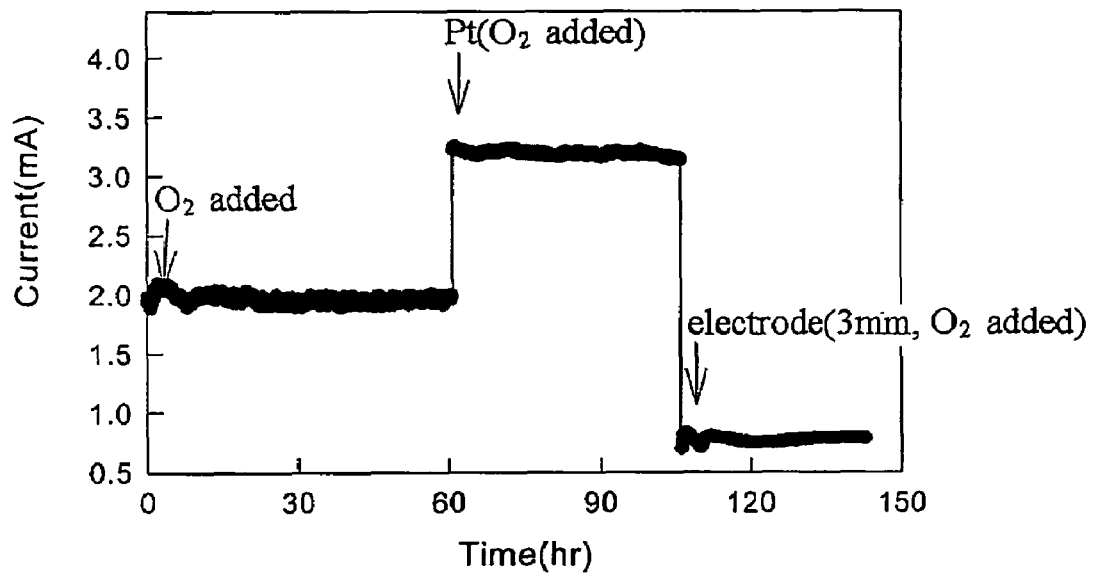
FIG. 6 is a graph showing the change in electric current generation according to the type of electrode used in a cathode compartment of an enriched microbial fuel cell.
Figure 6B:
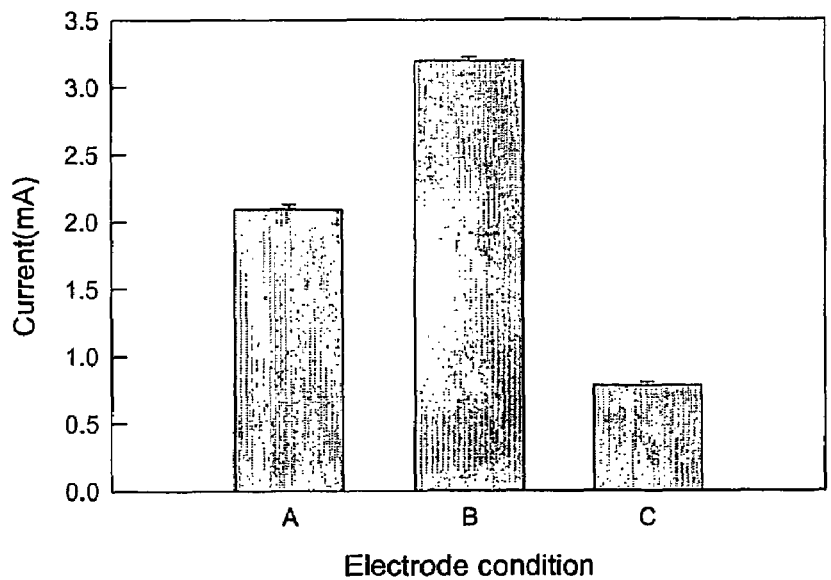

When the rate of oxygen fed to a cathode compartment was maintained to at least 60 ml/min, the maximum electric current was generated and the concentration of dissolved oxygen was about 7.5 ppm. After operating a microbial fuel cell with an air feeding rate of 60 ml/min, as in Example 3, a cathode electrode [ten pieces of 1.27 cm (thickness)×10 cm (diameter) graphite felt] was removed and 7.7×5.8 cm (thickness× diameter, respectively) graphite felt coated with platinum at 3 mm thickness was used as a cathode electrode. The electric current generated was then measured. In addition, the value obtained was compared with that of the electric current generated by using graphite felt having the same size as the electrode coated with platinum. As can be seen from FIG. 6, 2.1 mA of electric current was generated when using the original electrode, and electric current was increased to 3.1 mA when using the electrode coated with platinum. 0.7 mA of electric current was generated when 7.7×5.8 cm (thickness× diameter, respectively) graphite felt with no platinum coating was used as a cathode electrode. These results show that the performance of a microbial fuel cell can be improved when a material having the high catalysis of reducing oxygen is used in a cathode.

Example 5

Effect of the Distance Between a Cathode Compartment and an Anode Compartment

Figure 7:
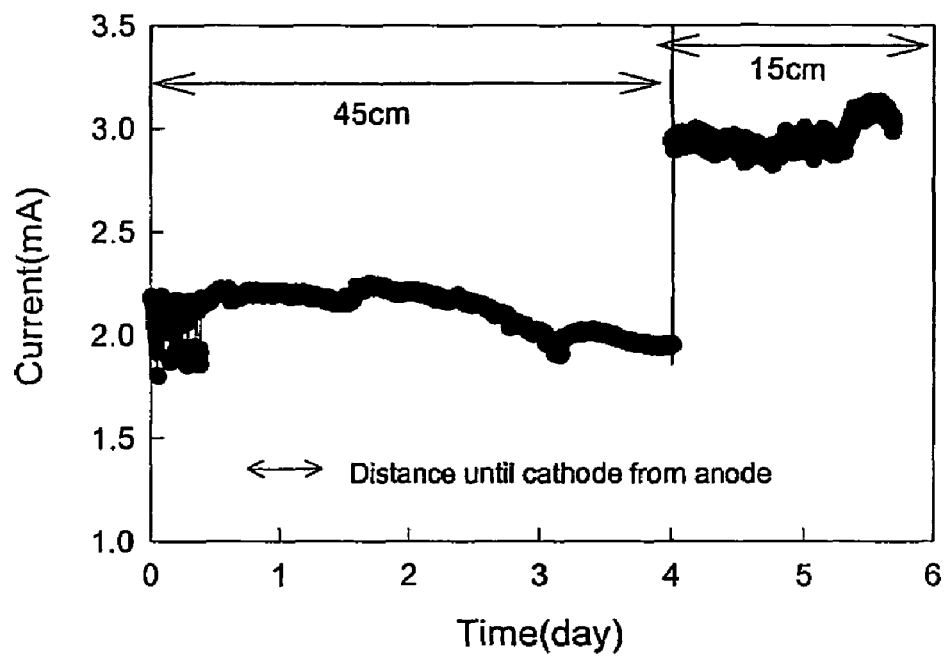
FIG. 7 is a graph showing the change in electric current generation according to the distance between a cathode compartment and an anode compartment of an enriched microbial fuel cell.

FIG. 7 shows that distance between a cathode compartment and an anode compartment affects electric current generation. In all previous examples, the systems were operated at a distance of 45 cm between the anode and the cathode. As can be seen from FIG. 7, when the operational distance was reduced from 45 cm to 15 cm, the electric current generated was increased from 2.1 mA to about 3.0 nA. The COD concentration of the discharged water was also decreased from about 25~30 ppm to below 20 ppm. This indicates that if the distance between two electrodes is reduced, the transfer distance of proton is reduced; subsequently, the performance of a microbial fuel cell can be improved.

INDUSTRIAL APPLICABILITY

A mediator-less microbial fuel cell according to the present invention can be operated without using an expensive cation-exchange membrane, of which efficiency is by no means inferior to prior wastewater treatment methods.

Moreover, a membrane-less microbial fuel cell of the present invention has further advantages in that wastewater primarily treated in an anode compartment can be used as an electrolyte in a cathode compartment. Therefore, a special electrolyte does not necessarily have to be utilized in the cathode compartment. In addition, the wastewater is aerobically treated in the cathode compartment.

While the present invention has been described with reference to some preferred embodiments, those skilled in the art can deduce that variations and modifications are possible without deviating from the broad principles of the present invention, which is defined by the following claims.

The invention claimed is:

1. A membrane-less and mediator-less microbial fuel cell comprising a cathode compartment, an anode compartment, glass wool and glass bead for separating the cathode compartment and anode compartment, a means for feeding air to the cathode compartment, and a means for feeding wastewater to the anode compartment, wherein wastewater fed to the anode compartment is anaerobically treated in the anode compartment, is transferred to the cathode compartment via the glass wool and the glass bead, is aerobically treated in the cathode compartment, and is then discharged from the cathode compartment.

2. A membrane-less and mediator-less microbial fuel cell according to claim 1, wherein a distance between the cathode compartment and the anode compartment is controlled by a height of the glass wool and the glass bead.

3. A membrane-less and mediator-less microbial fuel cell according to claim 1, wherein graphite felt or graphite felt coated with metal is used as an electrode of the cathode compartment.

4. A membrane-less and mediator-less microbial fuel cell according to claim 3, wherein graphite felt coated with platinum is used as an electrode of the cathode compartment.

5. A membrane-less and mediator-less microbial fuel cell according to claim 1, wherein a buffer solution is used in the anode compartment.

* * * * *